United States Patent [19]

Esaki et al.

[11] Patent Number: 5,189,667
[45] Date of Patent: Feb. 23, 1993

[54] METHOD AND APPARATUS FOR CONTROLLING CALL PROCESSING BASED UPON LOAD CONDITIONS

[75] Inventors: Hiroshi Esaki, Kanagawa; Takashi Kamitake, Tokyo, both of Japan

[73] Assignee: Kabushiki Kaisha Toshiba, Kawasaki, Japan

[21] Appl. No.: 638,984

[22] Filed: Jan. 10, 1991

[30] Foreign Application Priority Data

Mar. 1, 1990 [JP] Japan .................................. 2-47141

[51] Int. Cl.$^5$ .......................................... H04Q 11/04
[52] U.S. Cl. ..................................... 370/60; 370/85.6
[58] Field of Search ...................... 370/60, 94.1, 85.6, 370/54, 62

[56] References Cited

U.S. PATENT DOCUMENTS

| | | | |
|---|---|---|---|
| 4,340,776 | 7/1982 | Ganz | 370/85.13 |
| 4,698,803 | 10/1987 | Haselton | 370/60 |
| 4,864,560 | 9/1989 | Quinquis | 370/94.1 |
| 4,896,316 | 1/1990 | Lespagnol | 370/60 |
| 4,979,165 | 12/1990 | Dighe | 370/60 |
| 4,993,022 | 2/1991 | Kondo | 370/85.6 |
| 5,007,052 | 4/1991 | Flammer | 370/60 |
| 5,010,546 | 4/1991 | Kato | 370/85.11 |
| 5,012,262 | 5/1991 | Harshavardhana | 370/54 |
| 5,023,868 | 6/1991 | Davidson | 370/62 |

FOREIGN PATENT DOCUMENTS 63-17869 7/1988 Japan .
1-103100 1/1990 Japan .

OTHER PUBLICATIONS

T. Murase et al., "A Traffic Control for ATM Networks", Tech Rep. IEICI, SSE89-69, Sep. 1989, vol. 89, No. 195, pp. 7-12.
Grinsec, "Electronic Switching", pp. 411 to 415 by Elsevier Science Publishers, 1983.
Report on Japanese Electronic Information/Communication Institute "Traffice Control Method in ATM Communication Network", by Takase et al., No. SSE-88-185, pp. 25-30.

Primary Examiner—Douglas W. Olms
Assistant Examiner—T. Samuel
Attorney, Agent, or Firm—Foley & Lardner

[57] ABSTRACT

In a call set-up control operation used for a data packet communication network, a call set-up controlling method comprises the steps of: preparing a plurality of call set-up algorithms different from each other; and, selecting one of the call set-up algorithms suitable for a call set-up demand, depending upon at least a load condition of the packet data communication network, whereby the call set-up operation is carried out in accordance with the selected call set-up algorithm.

13 Claims, 6 Drawing Sheets

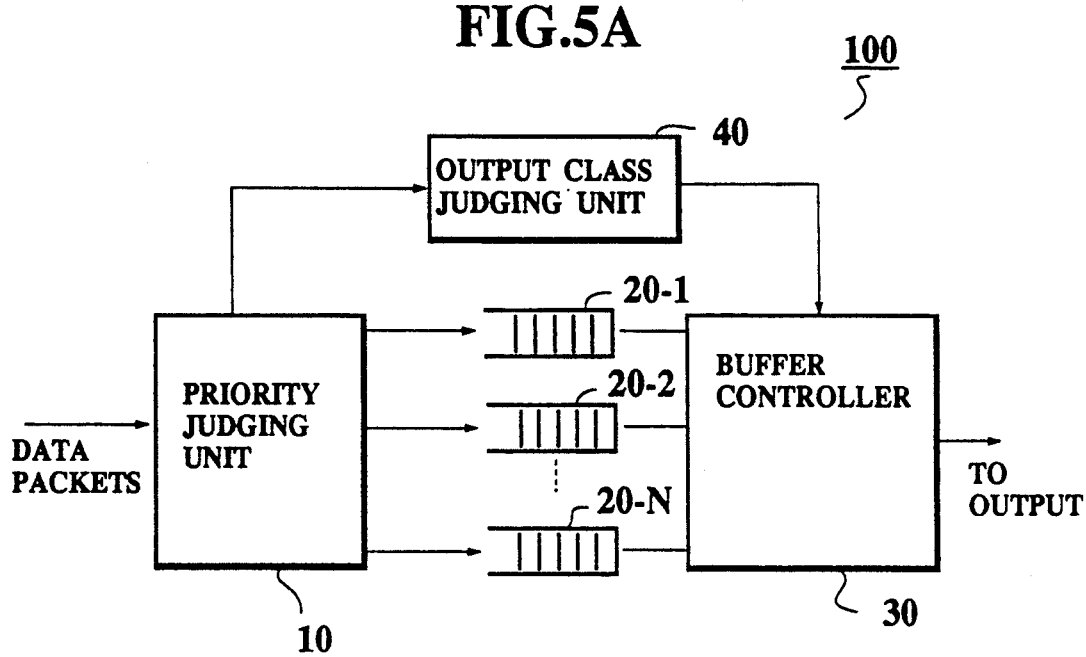
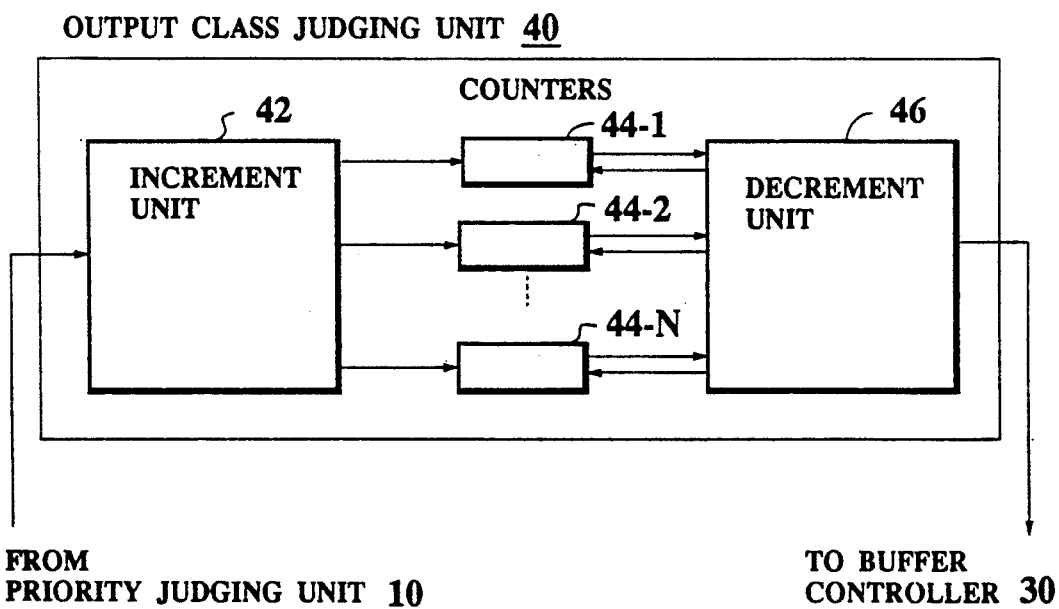

METHOD AND APPARATUS FOR CONTROLLING CALL PROCESSING BASED UPON LOAD CONDITIONS

BACKGROUND OF THE INVENTION

1. Field of the Invention

The present invention generally relates to a method and an apparatus for controlling call processing in a network. More specifically the present invention is directed to a method and apparatus capable of controlling a call set-up operation based upon load condidtions in a data packet communication network.

2. Description of the Related Art

In the conventional call set-up operation effected in a data packet communication network, in response to a call set-up request or demand from a terminal employed in the packet communication network, after a judgement is made as to whether or not the packet communication network can affirm or guarantee communication qualities of all calls stored therein, a decision may be made as to whether or not the call is connected or set-up therewith. This conventional call set-up control has been performed based on a predetermined call set-up algorithm without taking into account the quantity of idle resources and the workload of the CPU (central processing unit), i.e., load conditions of the communication network. Such a conventional call set-up controlling method is described in, for instance, GRINSEC "Electronic Switching" pages 411 to 415 by Elsevier Science Publishers, 1983.

However, the above-described conventional call set-up controlling methods have the following problems. First, since the call set-up controls are executed in accordance with a preselected (fixed) call set-up algorithm irrelevant to the load conditions of the packet communication network, the communication resources employed in the communication network cannot be utilized at desirably high efficiency. That is to say, for instance, when a so-termed "correct or complex, call set-up algorithm" is employed for the call set-up control, a large quantity of processing time is required for accomplishing this set-up control to maintain necessary communication qualities. On the other hand, when a so-called "simple algorithm" is utilized, a number of calls may be processed while maintaining allowable communication qualities. However, since the inference of required communication resource quantities is not so entirely correct or accurate, communication resources greater than actually required resources must be kept for establishing call set-up control, causing lower efficiency in the packet communication network.

The present invention has been made in an attempt to solve the above-described conventional problems, and therefore has an object providing a method and an apparatus capable of controlling a call set-up operation in accordance with load conditions of a packet communication network. In particular, there may be provided a call set-up controlling method and apparatus thereof capable of utilizing communication resources of higher efficiency than that of the conventional controlling method, and furthermore capable of shortening response time for deciding whether or not a call is acceptable.

Moreover, another object of the present invention is to provide a call set-up controlling method and apparatus thereof capable of controlling the call set-up operations, while varying the contents of applicable algorithms suitable to the load condition of the packet communication network.

SUMMARY OF THE INVENTION

To achieve the above described objects and other features of the present invention, a method for controlling call set-up operation in a packet data communication network, comprises the steps of:

preparing a plurality of call set-up algorithms different from each other; and, selecting one of the call set-up algorithms suitable for a call set-up demand, depending upon at least a load condition of the packet data communication network, whereby the call set-up operation is carried out in accordance with the selected call set-up algorithm.

Furthermore, according to the present invention, a call set-up control apparatus (100) for a data packet communication network, comprises:

a unit for storing a plurality of call set-up algorithms different from each other;

a unit (10) for judging priority orders of data packets to output priority-order judgement signals, the priority orders being determined based upon at least a load condition of the data packet communication network;

a plurality of buffer memories (20-1:20-N) for temporarily storing therein the data packets, depending upon the determined priority orders thereof; and, a unit (30:40) for controlling transfer of the data packets from the buffer memories (20-1:20-N) in response to the priority-order judgement signals.

BRIEF DESCRIPTION OF THE DRAWINGS

For a better understanding of the present invention, reference is made to the following description in conjunction with the accompanying drawings, in which:

FIGS. 5A and 5B are schematic block diagrams for representing an arrangement of a packet transfer controlling apparatus (100) according to the first preferred embodiment;

DETAILED DESCRIPTION OF THE PREFERRED EMBODIMENTS

FIRST BASIC IDEA

Both a method and an apparatus capable of controlling a call set-up operation, according to a first preferred embodiment of the present invention, are accomplished based upon the following first basic idea of the invention.

In accordance with the first basic idea, a plurality of call set-up controlling algorithms are first prepared. A selection is made of the suitable call set-up controlling algorithms based upon the load conditions (especially the quantity of idle resources) and also the number of waiting calls to be processed.

When there is a lesser quantity of idle resources, a call set-up control algorithm capable of efficiently utilizing a small quality of communication resources is employed. Accordingly, the utilization efficiency of the communication resources may be increased. Conversely, when the idle resources become extensive, a simple set-up control algorithm is employed. When the number of waiting calls to be processed exceeds a predetermined threshold value, a limitation (suppressive/rejection) for such call set-up demands is made, whereby response time for making a decision on call set-up allowance may be shortened.

OVERALL FIRST-CALL SET-UP CONTROLLING METHOD

Referring now to the flowchart shown in FIG. 1, an overall call set-up controlling method executed based on the above-described first basic idea will be described.

It is now assumed that the number of waiting calls to be processed is "QW", and when a set of states {Sn} (symbol "n" being a variable) with respect to this "QW" is considered, this set of states {Sn} is varied in accordance with a variation in QWs.

Figure 1:
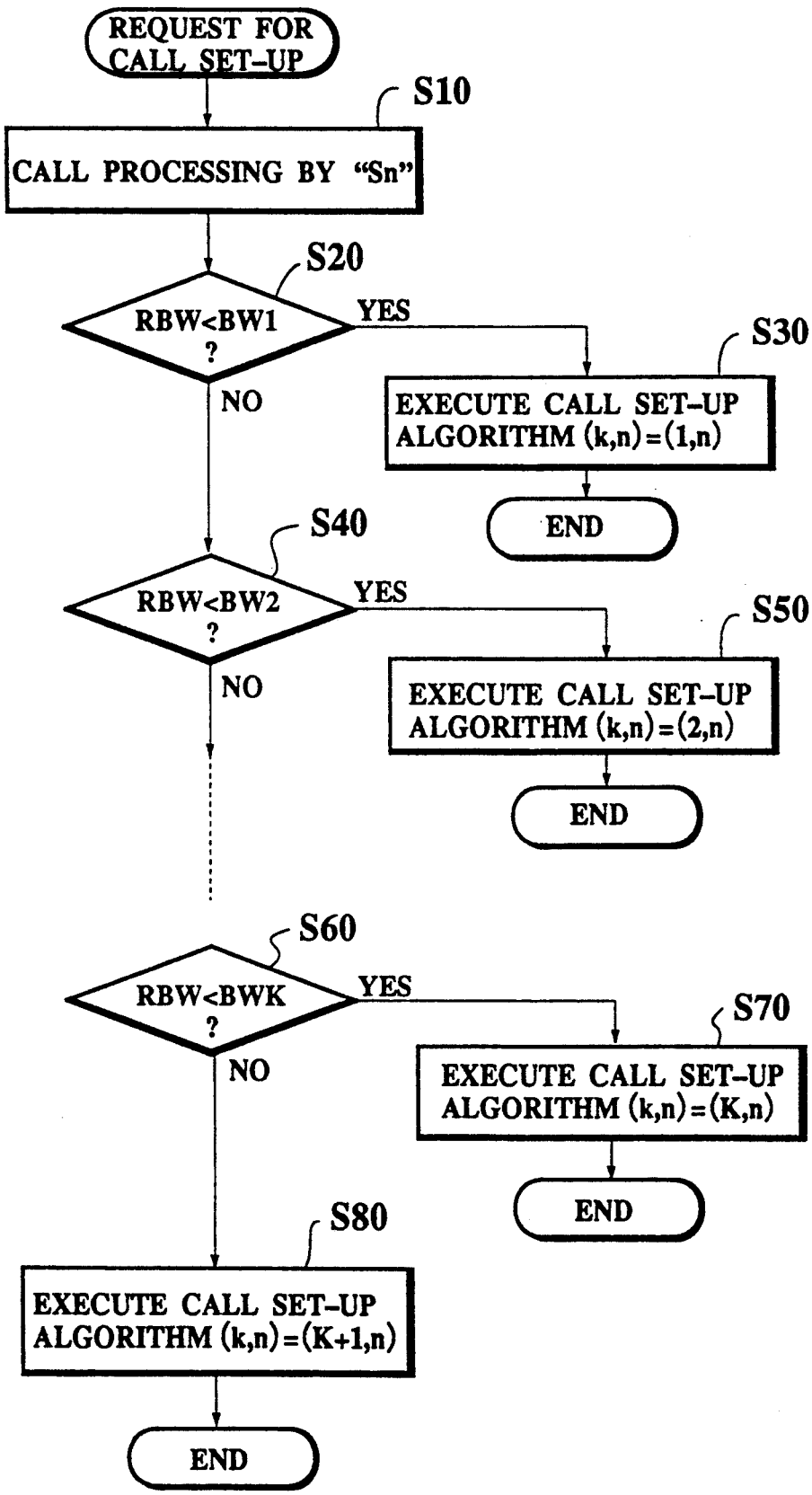
FIG. 1 is a flowchart for explaining an overall operation of a call set-up control method according to a first preferred embodiment of the present invention.

In the flowchart shown in FIG. 1, when a call set-up request or demand is established under such a set of states {Sn}, call processing, as defined at a step S10, with respect to the states {Sn} is carried out. Subsequently, the task of the call set-up controlling algorithm under the set of states {SRWk}, corresponding to the quantity of idle resources in the packet communication network, will now be initiated as follows.

First, assuming now that the quantity of idle resources is "RBW" and a set of threshold values for the communication resources amount is "BWk" (symbol "k" being a variable), the idle status RBW is compared with a first threshold value BW1 (where "k" is selected to be, for instance, "1") of the communication resource amount at a step S20. If the first threshold value BW1 is greater than the idle status RBW ("YES" at the step S20), then the process is advanced to a step S30 in which a call set-up control algorithm processing operation under the state SRW1 is executed. Accordingly, this call set-up operation is ended.

Conversely, when the first threshold value BW1 is smaller than the idle status RBW ("NO" at the step S20), this idle status RBW is compared with another (second) threshold value "BW2" of the communication resource in the case of "k" being selected to be 2 at a step S40. Then, if the second threshold value BW2 is greater than the idle status RBW ("YES" at the step S40), another call set-up controlling algorithm processing operation under the state SRW2 is performed at a step 50. As a result, this call set-up operation is completed. As previously explained, the threshold values "BW$_k$" (k=1, 2, ---, K) are successively compared with the idle status "RBW" in accordance with the values of "k". Under such values "k" that the threshold value BWk becomes greater than the idle status RBW, a preselected call set-up control algorithm processing operation is performed, and then this call set-up operation is completed.

When a comparison is made between the idle status "RBW" and another threshold value "BWk" of the communication resource under "k" is equal to "K" at a step S60, if the threshold value BWk is greater than the idle status RBW, a call set-up control algorithm processing operation under the condition of a state SRWK is executed at a step S70. Subsequently, this call set-up operation is ended. To the contrary, if the threshold value BWK is smaller than the idle status RBW, then a call set-up control algorithm processing operation is performed under condition of a state SRWK+1 in the case of "k" being equal to "K+1" at a step S80. Then, this call set-up operation is ended.

DETAILED PROCESS BASED ON NUMBER OF WAITING CALLS

Figure 2:
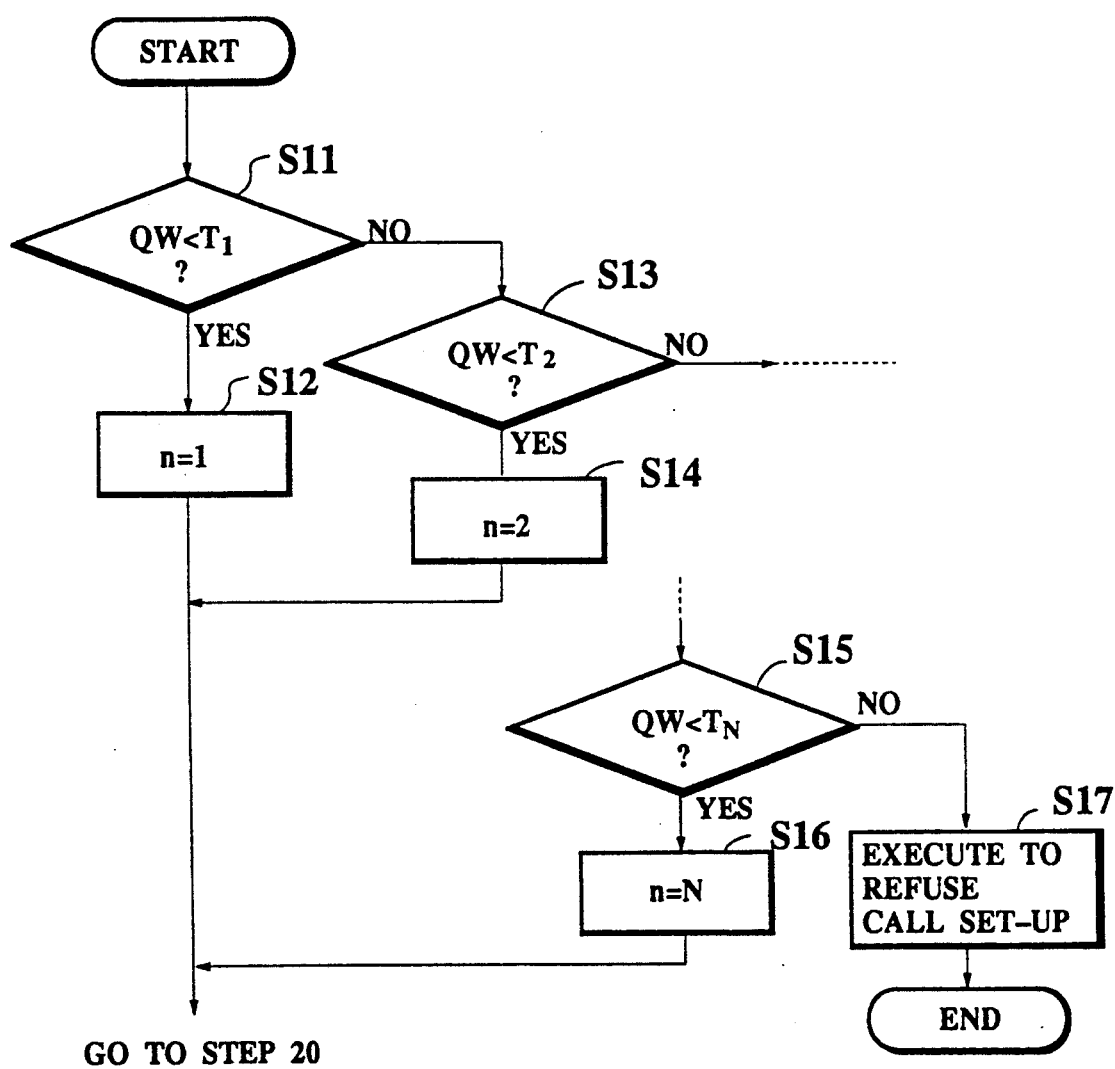
FIG. 2 is a flowchart for representing a detailed call set-up control algorithm shown in FIG. 1.

In FIG. 2, there is shown a flowchart for representing execution of a call set-up control algorithm based upon the number of waiting calls to be processed, as defined at the previous step S-10 shown in FIG. 1. A description will now be made of the call set-up control process under the state {Sn} with reference to this flowchart.

At a first step S11, a comparison is made between the number of waiting calls "QW" to be processed and a predetermined threshold value "Tn" for this waiting call number, for instance, a first threshold number T1 in case of "n" being equal to "1". If the waiting call number QW is smaller than the first threshold number T1, then a task of a call set-up control algorithm under a condition S1 (n=1) of the waiting call number to be processed is initiated at a step S12 and thereafter the process is advanced to the previous step S20 shown in FIG. 1. Conversely, if the waiting call number QW is greater than the first threshold number T1, the process is advanced to a further step S13 at which another comparison is established between this waiting call number QW and a second threshold number "T2" in case of "n" being equal to "2". When the waiting call number QW is smaller than this threshold number "T2", a task of a call set-up control algorithm under condition S2 (n=2) of the waiting call number to be processed is initiated at a step S14, and similarly the process is advanced to the previous step S20.

As previously stated, while the waiting call number QW is sequentially compared with the successive threshold numbers "Tn" (n=1, 2, ---, N) is accordance with the values of "n", when the threshold number TN ("n" being equal to a maximum "N") is compared with the waiting call number QW at a step S15, if the threshold number TN is greater than the waiting call number QW ("YES" at this step S15), a task of a call set-up control algorithm under a condition of SN (n=N) is initialized at a step S16. Then, the process is advanced to the previous step S20. To the contrary, when the waiting call number QW is greater than the threshold number "TN" ("NO" at the step S15), a call set-up refuse (rejection) process is performed at a step S17.

STATE TRANSITION

Figure 3:
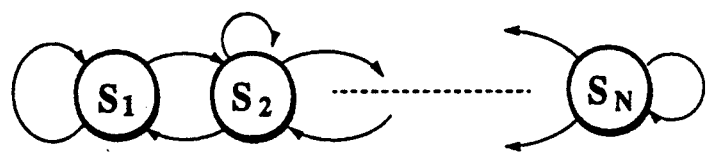
FIGS. 3 and 4 schematically illustrate state transition effected in the first preferred embodiment.
Figure 4:
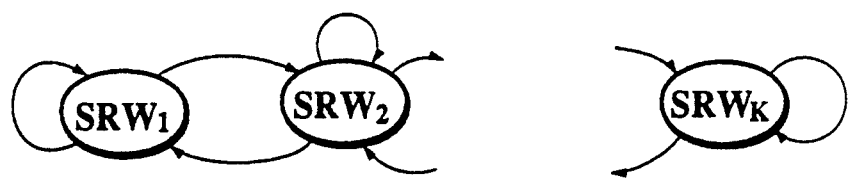

In accordance with the call set-up controlling method of the first preferred embodiment, as represented in FIG. 3, when the state {Sn} is transited, namely there is an increase in the waiting call number QW, there is a limitation on the task initiation. When the waiting call number QW is greater than a predetermined value, e.g., "TN", no task of the call set-up control algorithm is initiated with respect to a new call set-up demand, but a set-up refuse operation is executed. Subsequently, as illustrated in FIG. 4, after the call set-up process suitable for the state {Sn} has been executed, the task of the call set-up control algorithm under the condition }SRWk} in response to the quantity of idle resources is initiated. In other words, when there is a large quantity of idle resources in the packet communication network, a simple call set-up control algorithm may be employed. Conversely, when there is a small idle status thereof, a complex call set-up control algorithm may be employed by which the communication resources may be effectively utilized. For instance, the following call set-up control algorithm may be utilized, if the quantity of idle resources becomes large, a maximum bandwidth allocation method of the communication resources is applied. When the idle status thereof becomes small, a first set-up control method with employment of both the maximum and average bandwidth allocations for the communication resources, and a second set-up control method with employment of a probability density function are sequentially executed.

DETAILED CALL SET-UP CONTROL ALGORITHMS

As previously described, there are large quantities of the call set-up control algorithms. A detailed description on these control algorithms will now be mode.

First, a "maximum bandwidth allocation method" corresponds to a call set-up control algorithm used for such a relatively light load condition of a communication network, in which the call set-up control is carried out with employment of a maximum bandwidth "Wi" which has been requested by each of the calls for the network. Assuming now that a bandwidth of a multiplex line in question is selected to be "W", the call set-up requests are allowable within a range where a summation of these maximum bandwidths "Wi" does not exceed this bandwidth "W". Conversely, when the summation of the maximum bandwidths "Wi" exceeds the bandwidth "W", the processing operation will be then advanced to another call set-up control algorithm at a subsequent step. Otherwise, the processing operation will reject or refuse the further call set-up requests.

Then, a "method for utilizing both a maximum bandwidth and an average bandwidth" corresponds to such a call set-up control algorithm capable of effectively utilizing communication resources (i.e., bandwidths or buffers), as compared with the above-described maximum bandwidth allocation method. In accordance with this maximum/average bandwidth method, the call set-up control is carried out with employment of both a maximum bandwidth "Wi" and an average bandwidth "Mi" proposed by each of the calls.

Subsequently, in a method for employing an average bandwidth, when a measurement value directed to lowering communication qualities considerably deviates from a predetermined value, in comparison with an evaluation value obtained by using a value calculated, based on either the maximum bandwidth or average bandwidth, or otherwise on both of these bandwidths, the processing operation will refuse the call set-up demands, or will be advanced to a next step where another call set-up control algorithm is executed.

A further method for utilizing a probability density function is known from, for instance, Japanese patent application No. 1-103100, filed on Jan. 19, 1990. In accordance with a probability density function method, in each terminal or multiplexed packet streams, a traffic characteristic of packets produced during a unit time "T" is expressed by employing the probability density function; the probability density functions of the multiplexed packet streams may be obtained by convoluting these probability density functions; the network will infer a packet loss ratio (otherwise, a packet transmission delay time) based upon the probability density functions of the multiplexed packet streams, whereby this method makes a decision as to whether or not a call set-up operation is permitted.

In addition thereto, there have been proposed other known call set-up controlling algorithms, for instance, in the Report on Japanese Electronic Information/Communication Institute "TRAFFIC CONTROL METHOD IN ATM COMMUNICATION NETWORK" by Takase et al. No. SSE-88-185. In this controlling method, a virtual bandwidth has been determined for each terminal (assortment of terminals or an individual terminal) and a call set-up control is performed in such a manner that a total of these virtual bandwidths does not exceed all bandwidths. In another controlling method, a virtual buffer capacity has been determined for each terminal, which is reported by each terminal when a call is made therefrom, or has been previously stored in the network, and call set-up control is carried out in such a way that the total of the virtual buffer capacities never exceed call capacity of the buffers in which the relevant packet streams are multiplexed.

ARRANGEMENT OF FIRST PACKET TRANSFER CONTROL APPARATUS WITH PRIORITY CONTROL BASIS

Referring now to FIGS. 5A and 5B, an arrangement of a packet transfer control apparatus 100 with a priority control basis, according to a first preferred embodiment of the present invention, will be described, in which plural calls with distinct qualities are multiplexed within a single communication resource, and a call set-up control algorithm is executed on the priority basis.

FIG. 5A is a schematic block diagram of a major circuit portion of this packet transfer control apparatus 100, and FIG. 5B is a schematic block diagram of an internal circuit of the output class judging unit shown in FIG. 5A.

First, the packet transfer control apparatus 100 comprises a priority judging unit 10 for receiving data packets successively inputted thereto; a plurality of priority-graded buffers 20-1 to 20-N ("N" being an integer) for temporarily storing the data packets therein which have been selected based upon priority orders thereof; a buffer control unit 30 for controlling the buffers 20-1 to 20-N so as to transfer the data packets from the corresponding buffers 20-1 to 20-N; and an output class judging unit 40 for controlling the buffer control unit 30 in response to priority judging results obtained from the priority judging unit 10, whereby the desirable data packets temporarily stored in the relevant buffers may be transferred to an output of the packet transfer control apparatus 100 under the control of the buffer control unit 30 and the output class judging unit 40.

As shown in FIG. 5B, the output class judging unit 40 includes an increment unit 42 for receiving the priority judgement signal from the priority judging unit 10; a plurality of counters 44-1 to 44-N ("N" being an integer); and a decrement unit 46. These counters 44-1 to 44-N count up their count values under control of the increment unit 42, and count down their count values under control of the decrement unit 46.

PRIORITY CONTROL OPERATION

As previously explained in connection with FIG. 5A, there are "N" priority classes (grades). Therefore, "N"

priority-graded buffers 20-1 to 20-N are employed, and for instance, a data packet having a priority class "2" is stored within the priority graded buffer 20-2. Each of these priority-graded buffers 20-1 to 20-N is constructed of a FIFO (first-in first-out) memory. In FIG. 5A, upon receipt of a data packet, a priority class "m" ("m" being any integer from 1 to N) of the incoming packet is judged based upon header information of this packet in the priority judging unit 10. Based on this judgement result, this packet is outputted by this priority judging unit 10 into the selected priority-graded buffer 20-m. At the same time, the priority judging unit 10 announces the judged priority class "m" of this incoming packet to the output class judging unit 40. By this output class judging unit 40, one buffer having a top priority among the priority-graded buffers 20-1 to 20-N into which the packets have been stored is selected and an output priority class "n", for example, is determined. The buffer control unit 30 reads out the packet from the priority-graded buffer 20-n having the priority class "n" in response to the output priority class determined by the output judging unit 40, and thereafter outputs the read-out packet to the output of the packet transfer control apparatus 100.

As apparent from FIG. 5B, the priority judging unit 40 includes the counters 44-1 to 44-N in connection with the priority classes. For instance, the counter 44-1 represents a packet quantity stored into the priority-graded buffer 20-1 shown in FIG. 5A. In response to the priority of the incoming packet reported by the priority judging unit 10, the increment unit 42 causes the counter corresponding to the priority of the incoming packet, e.g., counter 44-2 to be incremented by 1. It should be noted that if the maximum storage packet number has been indicated in the relevant priority-graded buffer when the packet has arrived, the incoming packet cannot be stored therein and therefore should be discarded. As a consequence, no change is made in the content of this counter. On the other hand, the decrement unit 46 reads out the contents of these counters 44-1 to 44-N, selects the counter e.g., "44-n" having top priority among the counters 44-1 to 44-N whose contents are not equal to zero, and then outputs the priority "n" of this selected counter 44-n to the buffer control unit 30 (see FIG. 5A). At the same time, the decrement unit 46 decrements the content of this counter 44-n by 1.

OVERALL OPERATION OF CALL SET-UP CONTROL APPARATUS

In the packet transfer control apparatus 100 shown in FIGS. 5A and 5B, the priority-selected buffers 20-1 to 20-N are classified in accordance with the packet loss ratio classes. This control system 100 is so designed that the data packets having the lower priority grade (class) are not supplied from the corresponding buffers 20 via the buffer control unit 30 to the output of this system until the data packet having the higher priority grade (class) have been completely outputted (namely until no data packet is stored in the buffers). In this apparatus 100, prediction on the packet loss ratios for the respective priority classes is carried out based upon the following three methods 1 to 3, whereby the call set-up operation thereof may be controlled. It should be noted that although this preferred embodiment is directed to two priority classes, it may be easily understood that more than three priority classes are realized by the same method.

a) METHOD 1

It is to be noted that a call having priority is expressed by a suffix "1", whereas a call having no priority is indicated by a suffix "2". At a conceivable time interval, a probability density function for a quantity of packets generated from a call of each class is expressed by $\{q1(n)\}$ and $\{q2(n)\}$. For instance, in case of Poisson's input, the probability density function may be represented by the following equation (1):

$$qi(n) = (\rho i)^n / n! \exp(-\rho i) \qquad (1)$$

Here, "Pi" means an average number of packets generated from a call of class i (i = 1, 2) during the conceivable time interval.

Also, when the packet generation quantity of each call is expressed by the probability density function, a value of this probability density function may be directly utilized as $\{qi(n)\}$. At this time, a state of a queue length (i.e., total packet quantity within buffer) within a buffer is defined as follows:

$$S(i1, i2):$$

where, symbol "i1" indicates a queue length within a buffer corresponding to a call having priority, and symbol "i2" denotes a queue length within a buffer corresponding to a call having no priority.

With respect to the thus defined S (i, j), a state transition probability h (i1, i2; j1, j2) defined by $\{qi(n)\}$ may be defined by the following A) to F). It should be noted that the state transition probability h (i1, i2; j1, j2) corresponds to a transition probability from a state S (i1;i2) to a state S (j1, j2); symbol "B1" indicates a buffer length of calls having priority; symbol "B2" denotes a buffer length of calls having no priority; and "others" implied any other combinations between "i2" and "j2".

$$i1 = 0, i2 = 0 \qquad A)$$

$$h(0, i2; 0, j2) =$$

$$\begin{bmatrix} q(0)[q2(0) + q2(1)] + & (i2 = 0, j2 = 0) \\ q1(1)q2(0) & (i2 \geq 1, i2 - 1 = j2) \\ q1(0)q2(0) & (i2 \geq 1, i2 \leq j2 \leq R2 - 1) \\ q1(0)q2(j2 - i2 + 1) + & \\ q1(1)q2(j2 - i2) & \\ q1(0) \sum_{m \geq B2 - i2 + 1} q2(m) + (j2 = B2) & \\ q1(1) \sum_{m \geq B2 - i2} q2(m) & \\ 0 & (\text{others}) \end{bmatrix}$$

$$i1 = 1, j1 = 0 \qquad B)$$

$$h(1, 2; 0, j2)$$

$$\begin{bmatrix} q1(0)q2(j2 - i2) & (i2 \leq j2 \leq B2 - 1) \\ q1(0) \sum_{m \geq B2 - i2} q2(m) & (j2 = B2) \\ 0 & (\text{others}) \end{bmatrix}$$

$$i1 - 1 \leq j1, 1 \leq j1 \leq B1 - 1 \qquad C)$$

$$h(i1, i2; j1, j2) =$$

-continued $$\begin{bmatrix} q1(j1 - i1 + 1)q2(j2 - i2) & (i2 \leq j2 \leq B2 - 1) \\ q1(j1 - i1 + 1) \sum_{m \geq B2 - i2} q2(m) & (j2 = B2) \\ 0 & (\text{others}) \end{bmatrix}$$

$j1 = B1$  D)

$h(i1, i2; B1, j2)$ $$\begin{bmatrix} \left[ \sum_{m \geq B1 - i1 + 1} q1(m) \right] q2(j2 - i2) & (i \leq j2 \leq B2 - 1) \\ \left[ \sum_{m \geq B1 - i1 + 1} q1(m) \right] \left[ \sum_{m \geq B2 - i2} q2(m) \right] (j2 = B2) \end{bmatrix}$$

$i1 - 1 > j1$  E)

$h(i1, i2; j1, j2) = 0$

Assuming now that a matrix "H" is defined as {h (i1, i2; j1, j2)} and also a steady state probability of the state S(i, j) is denoted by "Pij", P={Pij} may be calculated from the following equation (2):

$$(H - I)P = 0 \quad (2)$$

$$\sum_{i,j} pij = 1$$

where symbol "I" indicates a unit matrix.

Accordingly, a packet loss rate of each call may be inferred by the following formulae (3) and (4):

(A) Packet loss ratio of call having priority (A) Packet loss ratio of call having priority $$CLR = \frac{1}{\Sigma m \cdot q1(m)} \left\{ \sum_{i=0}^{B1} \sum_{j=0}^{B2} \sum_{m > B1 - i + 1} (m + i - B1 - 1) Pij \cdot q1(m) \right\} \quad (3)$$

(B) Packet loss ratio of call having no priority $$CLR = \frac{1}{\Sigma m \cdot q1(m)} \left\{ \sum_{i=1}^{B2} \sum_{j=0}^{B2} \sum_{m > B2 - j} (m + j - B2) Pij \cdot q2(m) + \sum_{j=0}^{B2} \sum_{m > B2 - j} (m + j - B2) P0j[1 - q1(0)] q2(m) + \sum_{j=0}^{B2} \sum_{m > B2 - j + 1} (m + j - B2 - 1) P0j \cdot q1(0) \cdot q2(m) \right\} \quad (4)$$

b) METHOD 2

At a conceivable time interval, a probability density function of a quantity of data packets generated from a call in each class is expressed by {q1(n)}, {q2(n)}, which is similar to the above-described METHOD 1. Similarly, symbol "B1" indicates a buffer length corresponding to calls having priority, and symbol "B2" denotes a buffer length corresponding to calls having no priority.

First, a packet loss ratio with respect to the buffer corresponding to the call having priority is inferred. Assuming now that a state where a queue length of a buffer corresponding to a call having priority is equal to "i", is defined as "Si", and also a steady state probability thereof is defined as "pi", a state transition probability h (i, j) from the state "Si" into the state "Sj" is given by the following formula (5):

$$h(i,j) = \begin{bmatrix} q1(0) + q1(1) & (i = 0, j = 0) \\ q1(0) & (i = 1, j = 0) \\ q1(j - i + 1) & (i - 1 \leq j, 1 \leq j \leq B1 - 1) \\ \sum_{m \geq B1 - i + 1} q1(m) & (j = B1) \\ 0 & (\text{others}) \end{bmatrix} \quad (5)$$

If a state transition matrix "H" is expressed by {h(i, j)} and {Pi} is equal to "P", then "P" may be obtained from the below-mentioned equation (6):

$$(H - I) \cdot P = 0 \quad (6)$$

$$\sum_{i=0}^{B1} pi = 1$$

Under such circumstances, the packet loss ratio of the call having priority is inferred based on the following equation (7):

$$CLR = \quad (7)$$

$$\frac{1}{\Sigma m q1(m)} \left\{ \sum_{i=0}^{B1} \sum_{m > B1 - i + 1} (m + i - B1 + 1) Pi \cdot q1(m) \right\}$$

Figure 6:
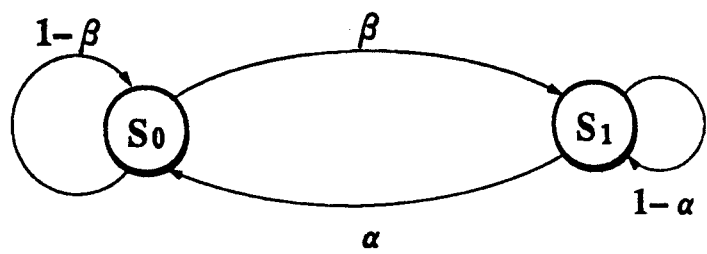
FIG. 6 schematically illustrates a state transition model control performed in the first preferred embodiment.

Next, a packet loss ratio of a call having no priority will now be inferred. Assuming now that a probability of such a condition that a queue length of calls having priority is equal to zero, which is evaluated by means of "pi" with respect to the buffer corresponding to the call having priority which has been performed above, is selected to be $P_p(0) = p0$, and also another probability being not equal to zero is selected to $P_p(1) = 1 - p0$, and furthermore transition between these states is represented in FIG. 6, alpha ($\alpha$) is obtained from the following equation (8). It should be noted that in FIG. 6, symbol "$S_0$" implies such a state that a queue length of a buffer having priority is equal to zero, and symbol "$S_1$" means such a state that queue length of a buffer having priority is not equal to zero.

$$1 - \beta = q1(0) + q1(1) \quad (8)$$
$$P_p(0) = \alpha/(\alpha + \beta)$$
$$P_p(1) = \beta/(\alpha + \beta)$$

Then, a state S(p, i) of a buffer having no priority and also a steady state probability P(p, i) are defined as follows:

State S(p, i)

symbol "p" indicates a buffer state of a call having priority (queue length zero=0, otherwise 1), and symbol "i" denotes a queue length within a buffer having no priority.

Steady State Probability of S(p, i):P(p, i)

It is assumed that $\{P(0, i)\}$ is P0 and $\{P(1, i)\}$ is P1. Furthermore, state transition probabilities $H0=\{h0ij\}$ and $H1=\{h1ij\}$ are defined by (I) and (J).

$$h0(i,j) = \begin{cases} q1(0) \cdot [q2(0) + q2(1)] + [1 - q(0)] \cdot q2(0) & (i = j = 0) \\ q1(0) \cdot q2(0) & (j = i + 1) \\ q1(0) \cdot q2(i - j + 1) + [1 - q1(0)] \cdot q2((i - j)) & (j \leq 1, i \neq 0, i \leq B2) \\ q1(0) \cdot \sum_{m \geq B2-j+2} q2(m) + [1 - q1(0)] \cdot \sum_{m \geq B2-j+1} q2(m) & (i = B2) \end{cases} \tag{I}$$

$$h1(i,j) = \begin{cases} q2(i - j) & (i \geq j, i = B2) \\ \sum_{m \leq B2-j+1} q2(m) & (i = B2) \\ 0 & \text{(others)} \end{cases} \tag{J}$$

Accordingly, the probabilities "P0" and "P1" may be obtained by the following formula (9):

$$\begin{bmatrix} (1 - \beta)H0 & \alpha H0 \\ \beta H1 & (1 - \alpha)H1 \end{bmatrix} \begin{bmatrix} P0 \\ P1 \end{bmatrix} = \begin{bmatrix} P0 \\ P1 \end{bmatrix} \tag{9}$$

$\Sigma_p(0,1) = \alpha/(\alpha + \beta)$
$\Sigma_p(1,i) = \beta/(\alpha + \beta)$ At this time, the packet loss ratio of the call having no priority will be given by the following equation (10):

$$CLR = \frac{\sum_{i=0}^{B2} \sum_{m \geq B2-i} P(0,i) \cdot q2(m) \cdot [(m + 1 - B2) \cdot (1 - q1(0)) + \max[0,(m + 1 - B_2 - 1)] \cdot q1(0)] + \sum_{i=0}^{B2} \sum_{m \geq B2-i} P(1,i)(m + i - B2) \cdot q2(m)}{\sum_{m \geq 0} m \cdot q_2(m)} \tag{10}$$

c) METHOD 3

This method 3 is so-called as a "quasi-steady state approximation method". In accordance with the quasi-steady state approximation method, assuming that a plurality of system states are considered and these system states are brought into quasi-steady conditions, the packet loss ratio is predicted by giving weights, depending upon an occurrence rate of states.

Assuming now that an occurrence probability of a state "i" is P(i) and a packet loss ratio under this state is CLR(i), the desirable packet loss ratio may be inferred as defined by an equation (11):

$$CLR = \sum_{i=0}^{\infty} CLR(i) \cdot P(i) \tag{11}$$

It should be understood that a probability density distribution of a queue length within a buffer may be obtained from the above-described method for inferring the packet loss ratio. As a consequence, a distribution of a queuing delay in the buffer may be also inferred, and thus, a packet transmission delay within a network may be inferred based upon a transmission delay among exchange nodes and this inferred queuing delay distribution. Further, the above-described inferring method for the packet loss ratio may be applied to such a case that a single class of a communication quantity is guaranteed by the network.

SECOND CALL SET-UP CONTROL

Referring now to a flowchart shown in FIG. 7, a call set-up control method according to a second preferred embodiment will be described. In the second call set-up control method, a call set-up algorithm employed therein is varied based upon the quantity of call set-up requests which are waiting to be processed set-up operations.

Figure 7:
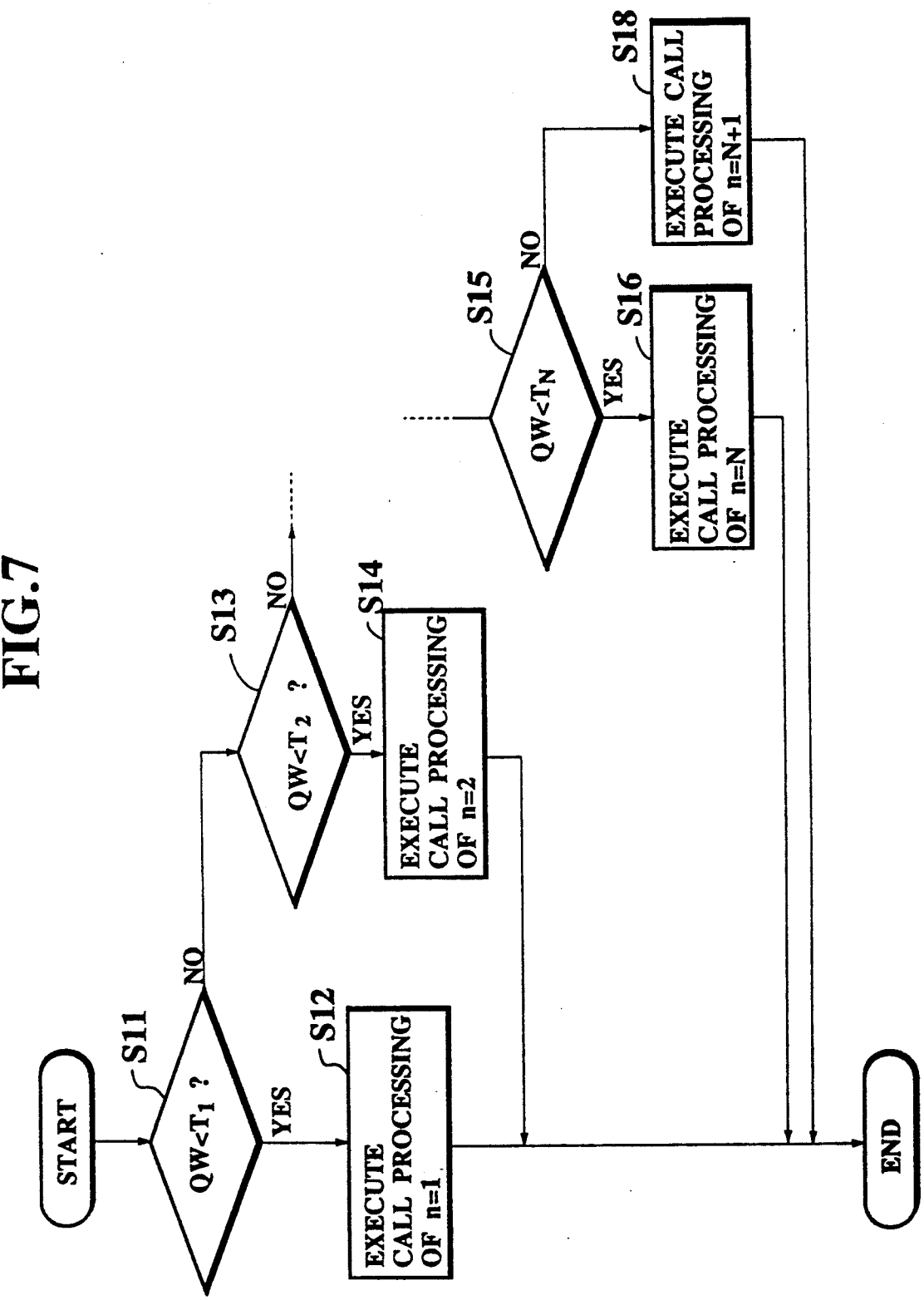
FIG. 7 is a flowchart for explaining another call set-up controlling method according to a second preferred embodiment.

More specifically, in the flowchart shown in FIG. 7, a comparison is made between the number "QW" of waiting calls to be processed and a threshold value "$T_1$" determined for the waiting call number in case of n=1 at step S11. If "YES" (the waiting call number QW is smaller than the threshold value "$T_1$"), then a task of a call set-up algorithm at n=1 is initiated at step S12. Conversely, if "NO", then the process is advanced to step S13 at which this waiting call number QW is compared with another threshold value $T_2$, then the process is advanced to step S14 in which a task of a call set-up algorithm under n=2 is initiated. Subsequently, further comparisons are executed between the waiting call number QW and the respective threshold values Tn (n=1, 2, ---, N). When the waiting call number QW first becomes smaller than the relevant threshold value, the task of the call set-up algorithm under the relevant number "n" is initiated. Finally, the waiting call number QW is compared with a threshold value $T_N$(n=N) at a steps S15. If the waiting call number QW is smaller than this threshold value $T_N$, a task of a call set-up algorithm under n=N is initiated at step S16. To the contrary, if the waiting call number QW is greater than this threshold value $T_N$, a task of a call set-up algorithm under n=N+1 is, initialized at step S18. As this call set-up algorithm is under n=N+1, for instance, a call set-up demand is immediately refused.

THIRD CALL SET-UP CONTROL

Figure 8:
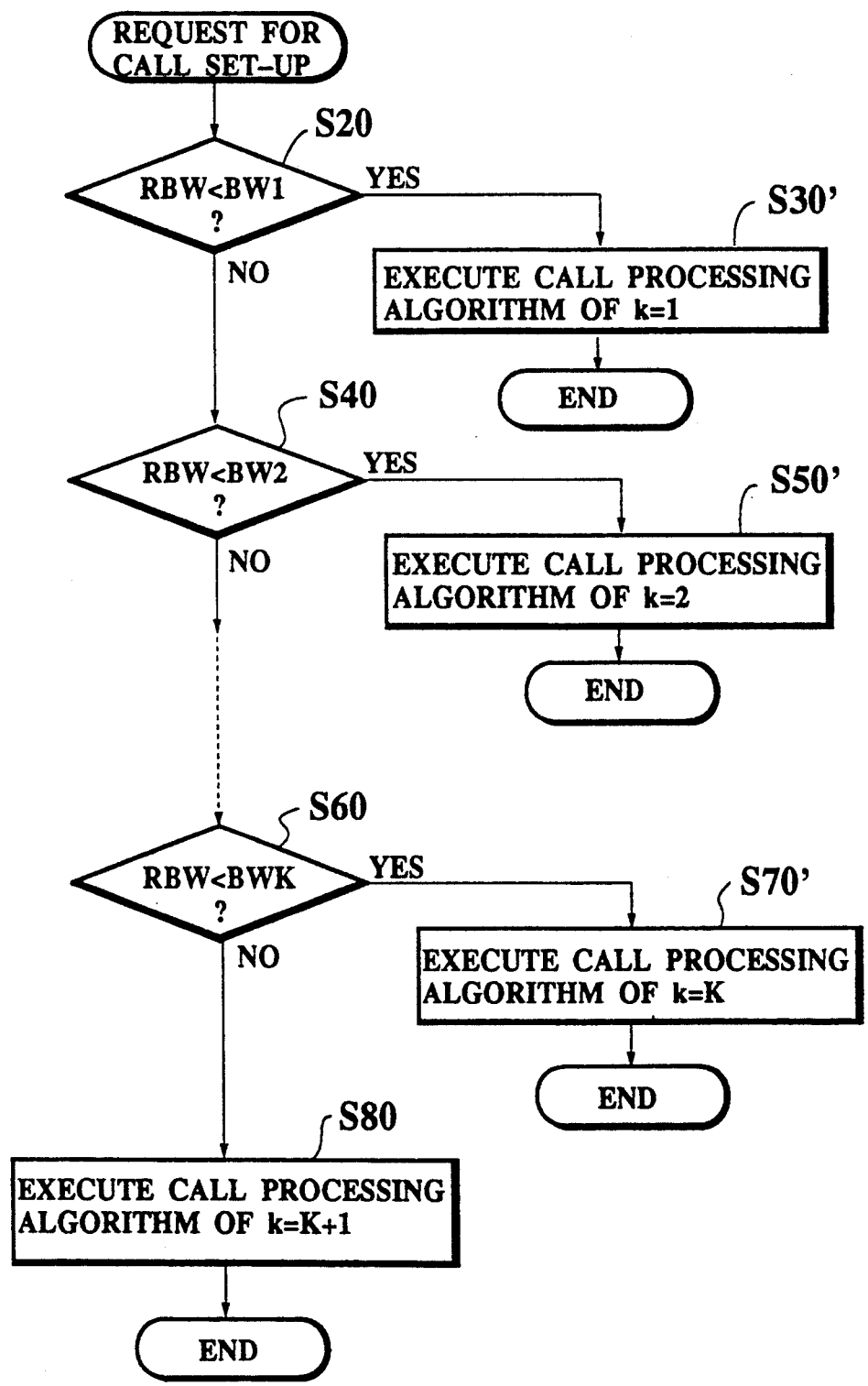
FIG. 8 is a flowchart for explaining a further call set-up controlling method according to a third preferred embodiment.

FIG. 8 is a flowchart for explaining another call set-up control method according to a third preferred embodiment of the present invention.

In the third call set-up control method, a call set-up algorithm is properly changed, depending upon the quantity of idle resources and the utilization ratio of the CPU. As is apparent from FIG. 8, since the major process operation of the third call set-up control method is the same as that of the second call set-up control method shown in FIG. 7, only different process operations will now be explained.

At a step S30', when the quantity of the idle resource RBW is smaller than the threshold value $BW_1$ of the communication resource at a step S20, then a task of a call set-up algorithm under K=1 is initiated. Similarly, other call set-up algorithms are initiated at steps S50' and S70'. It should be noted that at the step S30 of the first call set-up control shown in FIG. 1, one proper algorithm is executed under the two-dimensional condition of "K=1" and "n=n", whereas at the step S30' of the third call set-up control shown in FIG. 8, another proper algorithm is executed under the one-dimensional condition of "K=1".

While the present invention has been described in detail, a plurality of call set-up control algorithms are prepared and the proper set-up control algorithm is selected depending upon the load conditions of the packet communication network. Accordingly, the communication resources may be effectively utilized, causing the higher utilization efficiency of the network. A quick response time for deciding whether or not the call set-up request is rejected may be achieved.

What is claimed is:

1. A method for controlling call set-up operation in a packet data communication network comprising the steps of:
    preparing a plurality of call set-up algorithms different from each other; and
    selecting one call set-up algorithm of said call set-up algorithms suitable for a call set-up demand, depending upon at least a load condition of said packet data communication network, whereby said call set-up operation is carried out in accordance with said one call set-up algorithm selected.

2. A call set-up controlling method as claimed in claim 1, wherein said load condition contains a quantity of idle resource and a workload of a central processing unit employed in said packet data communication network.

3. A call set-up controlling method as claimed in Claim 1, wherein said call set-up algorithms are constructed of maximum bandwidth allocation controlling and average bandwidth allocation controlling methods, and a controlling method employing a probability density function with respect to the number of data packets per unit time.

4. A call set-up controlling method as claimed in claim 1, wherein said call set-up algorithms are executed by storing calls with distinct qualities in a single communication resource in accordance with priority orders owned by the said calls respectively.

5. A call set-up controlling method as claimed in claim 1, wherein said selecting step further includes a step of checking a quantity of waiting calls to be processed in order to select a call set-up algorithm of said call set-up algorithms suitable for said call set-up demand.

6. A call set-up controlling method as claimed in claim 5, wherein said call set-up algorithms are constructed of maximum bandwidth allocation controlling and average bandwidth allocation controlling methods, and a controlling method employing a probability density function with respect to the number of data packets per unit time.

7. A call set-up controlling method as claimed in claim 5, wherein said call set-up algorithms are executed by storing calls with distinct qualities in a single communication resource in accordance with priority orders owned by said calls respectively.

8. A method for controlling call set-up operation in a packet data communication network, comprising the steps of:
    preparing a plurality of call set-up algorithms different from each other;
    selecting one call set-up algorithm of said call set-up algorithms suitable for a call set-up demand, depending upon both a quantity of waiting calls to be processed and a load condition of said communication network, whereby said call set-up operation is carried out in accordance with said one call set-up algorithm selected.

9. A packet transfer control apparatus for a data packet communication network, comprising:
    means for storing a plurality of call set-up algorithms different from each other;
    means for judging priority orders of data packets to output priority-order judgement signals, said priority orders being determined based upon at least a load condition of said data packet communication network;
    a plurality of buffer memories for temporarily storing therein said data packets, depending upon said priority orders thereof; and,
    means for controlling transfer of said data packets from said buffer memories in response to said priority-order judgement signals.

10. A packet transfer control apparatus as claimed in claim 9, wherein said controlling means comprises:
    an output class judging unit for outputting output priority-class signals in response to said priority-order judgement signals derived from said judging means; and
    a buffer controller for controlling said buffer memories in response to said output priority-class signals, whereby a data packet having top priority is first outputted from a buffer memory of said buffer memories.

11. A packet transfer control apparatus as claimed in claim 9, wherein said output class judging unit includes:
    a plurality of counters for representing as count values, numbers of data packets stored in corresponding buffer memories of said buffer memories;
    an increment unit for incrementing said count values of said counters by a predetermined value in response to said priority-order judgement signals; and
    a decrement unit for reading out said count values of said counters so as to select a counter having top priority among said plurality of counters, and for producing an output priority-class signal indicative of said top priority.

12. A packet transfer control apparatus as claimed in claim 9, wherein said call set-up algorithms are constructed of maximum bandwidth allocation controlling and average bandwidth allocation controlling methods, and a controlling method employing a probability density function with respect to the number of said data packets per unit time.

13. A packet transfer control apparatus as claimed in claim 9, wherein said judging means judges said priority orders of said data packets based upon not only said load condition of said data packet communication network, but also upon a quantity of calls waiting to be processed.

* * * * *